(12) United States Patent
Anderson et al.

(10) Patent No.: US 12,715,181 B2
(45) Date of Patent: Aug. 25, 2026

(54) SCROLLS THAT VACUUM SECURE OBJECTS TO COMPLEX SURFACES

(71) Applicant: The Boeing Company, Arlington, VA (US)

(72) Inventors: Eric Carlton Anderson, North Charleston, SC (US); Allen James Halbritter, Summerville, SC (US); Daniel Johnson, Charleston, SC (US); Adam Lee, Moncks Corner, SC (US); Luis Velasquez, Ladson, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/673,474

(22) Filed: May 24, 2024

(65) Prior Publication Data

US 2024/0308158 A1 Sep. 19, 2024

Related U.S. Application Data

(62) Division of application No. 16/818,167, filed on Mar. 13, 2020, now Pat. No. 12,030,266.

(51) Int. Cl.
*B29C 70/54* (2006.01)
*B29C 70/34* (2006.01)
(Continued)

(52) U.S. Cl.
CPC .......... *B29C 70/543* (2013.01); *B29C 70/342* (2013.01); *B29C 70/44* (2013.01); *B25J 15/0028* (2013.01)

(58) Field of Classification Search
None
See application file for complete search history.

(56) References Cited

U.S. PATENT DOCUMENTS 4,541,886 A * 9/1985 Marlow ................ B29C 70/388 156/574
5,564,553 A * 10/1996 Spletzer ................ A41H 43/02 198/429
(Continued)

FOREIGN PATENT DOCUMENTS

CN 108943768 A 12/2018
DE 112010001156 5/2012
(Continued)

OTHER PUBLICATIONS

Japan Patent Office, Notice for Reasons for Rejection in related Japan Patent Application No. 2021-039255, Dec. 3, 2024.
(Continued)

*Primary Examiner* — Abbas Rashid
*Assistant Examiner* — Caroline Beha
(74) *Attorney, Agent, or Firm* — Kolitch Romano Dascenzo Gates LLP

(57) ABSTRACT

Embodiments include apparatus for compacting an object onto a rigid tool by applying a negative pressure while the scroll of material overlays the object. The apparatus comprises one or more spindles and a scroll of material that is stored on the one or more spindles. The scroll of material comprises a permeable layer and an impermeable membrane wherein the impermeable membrane contacts the permeable layer and may extend beyond a perimeter of the permeable layer.

15 Claims, 12 Drawing Sheets

(51) Int. Cl.
*B29C 70/44* (2006.01)
*B25J 15/00* (2006.01)

(56) References Cited

U.S. PATENT DOCUMENTS 5,607,540 A * 3/1997 Onishi .................. B29C 64/147 156/235
2007/0284046 A1* 12/2007 Habisreitinger ........ B65B 33/04 156/352
2008/0169579 A1* 7/2008 Mueller-Hummel ........................ B29C 70/543 264/40.1
2010/0007065 A1* 1/2010 Reinhold ............. B25J 15/0052 425/504
2014/0083621 A1 3/2014 Li et al.
2014/0265058 A1 9/2014 Gautier et al.
2018/0339413 A1* 11/2018 Halbritter ........... B32B 37/1018
2019/0070772 A1* 3/2019 Stone ................. B29D 99/0003
2020/0376781 A1* 12/2020 Wadsworth ............. B29C 70/34

FOREIGN PATENT DOCUMENTS

GB 2256168 A 12/1992
JP 2013212554 A 10/2013
JP 2017052267 A 3/2017
WO WO2019188417 A1 10/2019

OTHER PUBLICATIONS

China Intellectual Property Office, examination report issued in related application No. 202110268891.9, May 31, 2025.
Brazilian Patent Office, Preliminary Office action issued in related application BR 102021004482-9, issued Dec. 23, 2025.

* cited by examiner

CONTROLLER
160
PUMP
150
END EFFECTOR
120
RIGID TOOL
110
100
122
123
124
136
VL
VP
FH
132
134
140
182
133
152
130
122
123
124
136
VL
FH
112

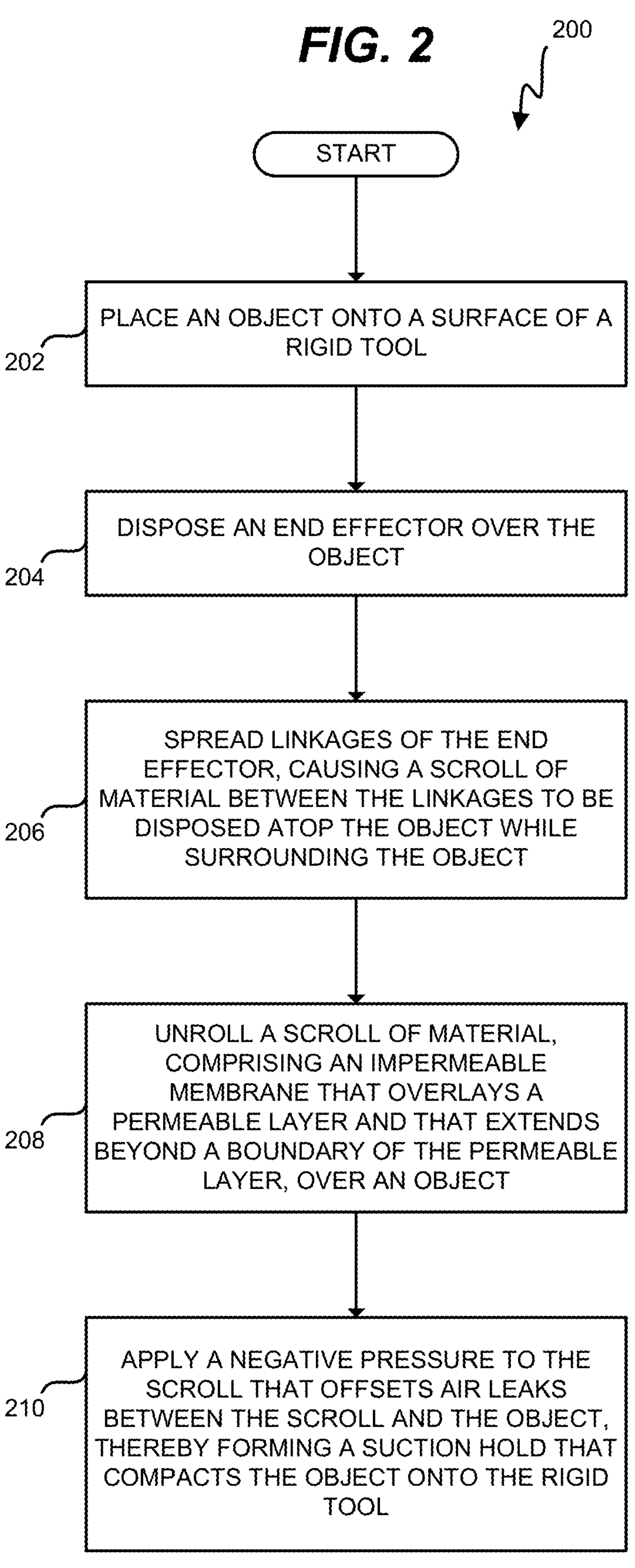
FIG. 2
200
START
PLACE AN OBJECT ONTO A SURFACE OF A RIGID TOOL
202
DISPOSE AN END EFFECTOR OVER THE OBJECT
204
SPREAD LINKAGES OF THE END EFFECTOR, CAUSING A SCROLL OF MATERIAL BETWEEN THE LINKAGES TO BE DISPOSED ATOP THE OBJECT WHILE SURROUNDING THE OBJECT
206
UNROLL A SCROLL OF MATERIAL, COMPRISING AN IMPERMEABLE MEMBRANE THAT OVERLAYS A PERMEABLE LAYER AND THAT EXTENDS BEYOND A BOUNDARY OF THE PERMEABLE LAYER, OVER AN OBJECT
208
APPLY A NEGATIVE PRESSURE TO THE SCROLL THAT OFFSETS AIR LEAKS BETWEEN THE SCROLL AND THE OBJECT, THEREBY FORMING A SUCTION HOLD THAT COMPACTS THE OBJECT ONTO THE RIGID TOOL
210

300
310
320
330
332
334
336
338
5
5

310
420
410
332
330
320
336
400
334
338

400
338
334
6
500
338
334
400

VACUUM SYSTEM 870
800
810
812
820
830
832
834
836
838
840
842
844
846
850
860
9

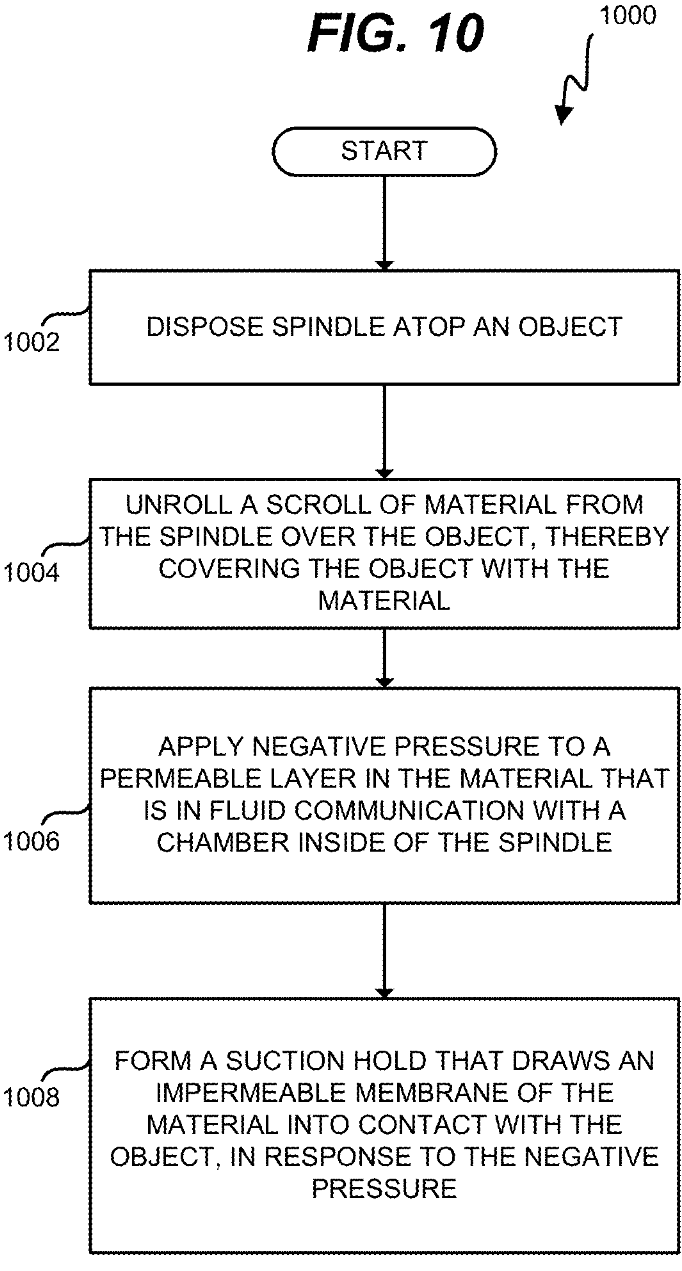
FIG. 10
1000
START
1002
DISPOSE SPINDLE ATOP AN OBJECT
1004
UNROLL A SCROLL OF MATERIAL FROM THE SPINDLE OVER THE OBJECT, THEREBY COVERING THE OBJECT WITH THE MATERIAL
1006
APPLY NEGATIVE PRESSURE TO A PERMEABLE LAYER IN THE MATERIAL THAT IS IN FLUID COMMUNICATION WITH A CHAMBER INSIDE OF THE SPINDLE
1008
FORM A SUCTION HOLD THAT DRAWS AN IMPERMEABLE MEMBRANE OF THE MATERIAL INTO CONTACT WITH THE OBJECT, IN RESPONSE TO THE NEGATIVE PRESSURE 1100
START
1102
DISPOSE SPINDLE ATOP AN OBJECT LOCATED AT A MANDREL
1104
AFFIX AN END OF THE SCROLL OF MATERIAL TO THE MANDREL
1106
APPLY NEGATIVE PRESSURE TO A PERMEABLE LAYER IN THE MATERIAL, THEREBY FORMING A SUCTION HOLD THAT PLACES THE MATERIAL INTO CONTACT WITH THE OBJECT
1108
UNROLL THE SCROLL WHILE THE NEGATIVE PRESSURE IS APPLIED 1204
SPECIFICATION AND DESIGN
1206
MATERIAL PROCUREMENT
1208
COMPONENT AND SUBASSEMBLY MFG.
1210
SYSTEM INTEGRATION
1212
CERTIFICATION AND DELIVERY
1214
IN SERVICE
1216
MAINTENANCE AND SERVICE
1200

AIRFRAME 1218
INTERIOR 1222
PROPULSION 1224
ELECTRICAL 1226
HYDRAULIC 1228
ENVIRONMENTAL 1230
SYSTEMS 1220
AIRCRAFT 1202

SCROLLS THAT VACUUM SECURE OBJECTS TO COMPLEX SURFACES

RELATED APPLICATION

This non-provisional application is a divisional application of co-pending U.S. patent application Ser. No. 16/818,167 filed on Mar. 13, 2020, which is incorporated herein by reference.

FIELD

The disclosure relates to the field of fabrication, and in particular, to preparation of composite parts.

BACKGROUND

Composite parts, such as carbon fiber parts, are formed by hardening preforms of fiber reinforced material while maintaining desired amounts of pressure and temperature. A preform that has not yet been hardened into a composite part does not yet exhibit full structural strength. Thus, a "green" preform may be incapable of supporting itself as laid-up onto a surface (e.g., a vertical or other non-horizontal surface) before it is hardened. This complicates the layup of large preforms onto complex surfaces (e.g., barrel shapes), because it increases the chance of a portion of a preform peeling off or shifting off of the forming tool before layup has been completed. Hence, accurate placement or locating of large and/or unwieldy layups remains difficult.

For preforms that are hardened via vacuum bag curing techniques, it is difficult to secure a vacuum bag around the preform before the preform peels away from (or shifts relative to) a corresponding complex surface. Further complicating the issue, materials such as tacky tape, which are used to secure the vacuum bag to the tool surface, are not contact approved and hence are not allowed to touch the uncured/unhardened composite material. As a result the entire layup must be completed prior to the application of the vacuum bag and affixation of the vacuum bag (via sealant) to the complex surface. Thus, it remains desirable to quickly and effectively secure preforms (and/or other objects) to complex surfaces, particularly when preforms are being arranged into complex assemblies.

Therefore, it would be desirable to have a method and apparatus that take into account at least some of the issues discussed above, as well as other possible issues.

SUMMARY

Embodiments described herein provide techniques wherein a scroll of material is rapidly deployed onto a preform that has been placed onto a mandrel. The scroll includes a permeable layer that enables airflow, as well as an impermeable layer that extends beyond the boundary of the permeable layer. During and after placement of the scroll, application of negative pressure causes the scroll to press into and compact an underlying preform, via a tapeless compaction process. After compaction has been completed, the scroll can be rapidly removed to enable vacuum bagging and hardening of the preform to take place.

One embodiment is a method for compacting an object onto a rigid tool. The method includes placing an object onto a surface of a rigid tool, disposing an end effector over the object, spreading linkages of the end effector, causing a scroll of material between the linkages to be disposed atop the object while surrounding the object, and applying a negative pressure to the scroll that offsets air leaks between the scroll and the object, thereby forming a suction hold that compacts the object onto the rigid tool.

A further embodiment is a non-transitory computer readable medium embodying programmed instructions which, when executed by a processor, are operable for performing a method for compacting an object onto a rigid tool. The method includes placing an object onto a surface of a rigid tool, disposing an end effector over the object, spreading linkages of the end effector, causing a scroll of material between the linkages to be disposed atop the object while surrounding the object, and applying a negative pressure to the scroll that offsets air leaks between the scroll and the object, thereby forming a suction hold that compacts the object onto the rigid tool.

A further embodiment is an apparatus for compacting an object onto a rigid tool. The apparatus includes an end effector that is configured to move towards a rigid tool, linkages that are coupled to the end effector and are configured to pivot relative to the end effector, spindles that are coupled to the linkages and that are rotatably mounted to the linkages, and a scroll of material that is stored on the spindles, and that is configured for placement onto an object at the rigid tool.

A further embodiment is an apparatus that includes a spindle, and a scroll of material that is wrapped around the spindle. One end of the scroll is sealed to the spindle, and another end of the scroll is affixed to an object. The material comprises a permeable layer, and an impermeable membrane that contacts the permeable layer.

A further embodiment is an apparatus that includes at least one spindle. The spindle includes an exterior, a chamber, and perforations that couple the chamber to the exterior. The apparatus also includes a scroll of material that is wrapped around the spindle. One end of the scroll is sealed to the spindle. The material comprises a permeable layer, and an impermeable membrane that contacts the permeable layer.

A further embodiment is an apparatus for compacting an object onto a rigid tool. The apparatus includes multiple spindles, and a scroll of material that is stored on the spindles, and that is configured for placement onto an object at the rigid tool as the spindles move apart from each other.

A further embodiment is a method for compacting an object placed onto a surface of a rigid tool. The method includes unrolling a scroll of material, comprising an impermeable membrane that overlays a permeable layer and that extends beyond a boundary of the permeable layer, over an object, and applying a negative pressure to the permeable layer that offsets air leaks between the scroll and the object, thereby forming a suction hold that compacts the object onto the rigid tool.

A further embodiment is a non-transitory computer readable medium embodying programmed instructions which, when executed by a processor, are operable for performing a method for compacting an object onto a rigid tool. The method includes unrolling a scroll of material, comprising an impermeable membrane that overlays a permeable layer and that extends beyond a boundary of the permeable layer, over an object, and applying a negative pressure to the permeable layer that offsets air leaks between the scroll and the object, thereby forming a suction hold that compacts the object onto the rigid tool.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2 is a flowchart illustrating a method for operating a scroll deployment system in an illustrative embodiment.

FIG. 9 is a cut-through view of the spindle of FIG. 8 in an illustrative embodiment.

FIG. 10 is a flowchart depicting a method of applying negative pressure via a spindle in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The scroll deployment systems described herein are capable of being utilized to compact preforms for composite parts, such as a preforms for sections of fuselage. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
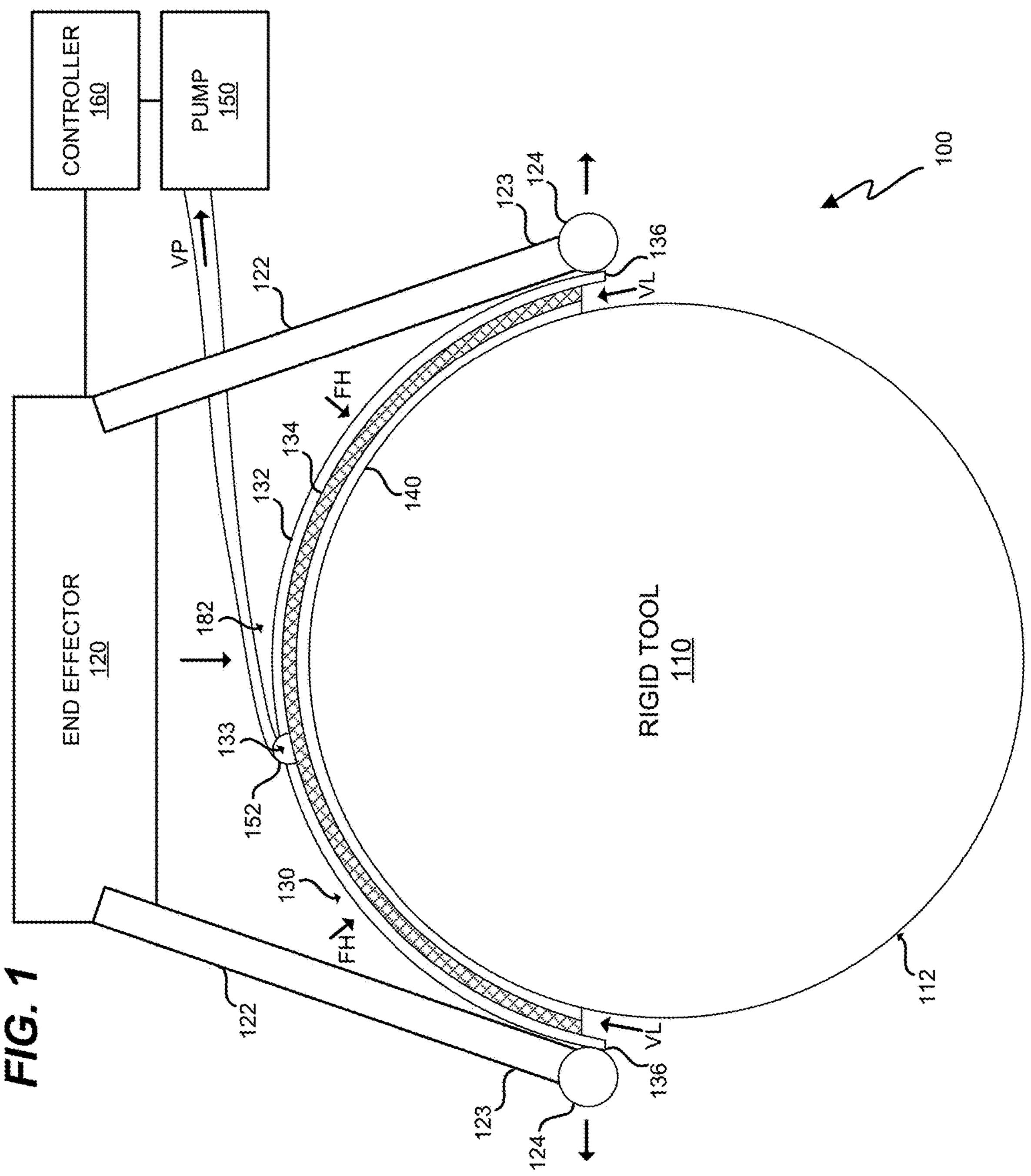
FIG. 1 illustrates a scroll deployment system in an illustrative embodiment.

FIG. 1 schematically illustrates a scroll deployment system 100 in an illustrative embodiment. Scroll deployment system 100 comprises any system or device that is capable of deploying a scroll of material over an object disposed at a rigid tool (e.g., a preform for a section of fuselage of an aircraft, disposed at a mandrel), and applying negative pressure that uniformly compacts the object onto the rigid tool. In this embodiment, scroll deployment system 100 comprises an end effector 120 that is configured to move towards (e.g., downwards towards) a rigid tool 110. Linkages 122 are coupled to the end effector and are configured to pivot relative to the end effector. As the linkages 122 pivot, their distal ends 123 move away from each other. Spindles 124 are coupled to the linkages, and are rotatably mounted to the linkages 122. Furthermore, the spindles 124 each store a portion of a scroll 130 of continuous material that is configured for placement onto an object 140 at the rigid tool 110. Thus, the spindles 124 carry the scroll 130 of material. In one embodiment, the scroll 130 comprises a permeable layer and an impermeable membrane, and the impermeable membrane extends beyond a perimeter of the permeable layer. In further embodiments, the scroll 130 also includes one or more layers of fiber reinforced material for compacting onto the object 140.

Pivoting of the linkages 122 causes spindles 124 to rotate, which deploys the scroll 130 of material from spindles 124. After deployment, the scroll 130 covers the object 140, and extends beyond the boundaries of the object 140 (e.g., circumferentially as well as into and out of the page). Accordingly, FIG. 1 depicts the scroll 130 in a deployed configuration relative to the object 140. In this embodiment, the object 140 is a preform that comprises multiple layers of fiber reinforced material (e.g., CFRP), is disposed at a surface 112 of a rigid tool 110, and awaits hardening into a composite part.

During and/or after deployment of the scroll 130, a pump 150 is operated to draw air from underneath the scroll 130. Specifically, the pump 150 draws air from underneath an impermeable membrane 132 (e.g., a latex sheet or other material that exhibits high levels of elongation while retaining impermeability) of the scroll 130 that covers the object 140. Pump 150 draws air via a port 152 that penetrates into the scroll 130 at an aperture 133, by applying negative pressure via the port 152. In this embodiment, the port 152 is located at an upper end portion 182 of the scroll 130. However, the port 152 may be located as desired at other portions of the scroll as desired. Port 152 penetrates the impermeable membrane 132, and may directly contact or be directly positioned over permeable layer 134 of the scroll 130.

Permeable layer 134 is both laterally and vertically air permeable, which enables negative pressure to be distributed evenly across the scroll 130. This means that negative pressure drawn via the port 152 is applied evenly across the object 140 instead of being localized at the port 152. The negative pressure secures the end flaps 136 of the scroll to the rigid tool 110 and forms a loose seal between the end flaps 136 and the rigid tool 110. That is, even though the end flaps 136 do not include adhesive or other means of chemical bonding, applied negative pressure loosely seals the end flaps to the rigid tool 110 via suction, so long as the amount of air being drawn by the pump 150 at least equals the amount of air lost to leaks between the end flaps 136 and the rigid tool 110. The negative pressure also compacts the scroll 130 onto the object 140, which ensures that the object 140 remains in place at the rigid tool 110.

Pump 150 is a high flow volume pump, which means that pump 150 is capable of drawing a great deal of air through the port 152, but not necessarily at a high pressure. In one embodiment, the pump 150 applies between twenty-two to twenty-nine inches of mercury (in. Hg) of negative pressure to form a vacuum, but at tens of Cubic Feet per Minute (CFM) of airflow (e.g., between fifty and two hundred CFM). Hence, pump 150 and port 152 may be capable of maintaining a pressure of at least one inch of mercury across the impermeable membrane (e.g., the covered area). This may be performed solely by pump 150, or in combination with other pumps as desired. The amount of pressure applied and amount of CFM drawn by pump 150 may vary as a function of total boundary length of the scroll 130.

Controller 160 manages the operations of pump 150 based on input from a sensor (not shown) such as a pressure sensor or flow rate sensor, in order to ensure that negative pressure is constantly within a desired range to overcome leaks along the perimeter of the scroll 130. Sensors may be located at any suitable location, such as at permeable layer 134, scroll 130, port 152, pump 150, etc. In one embodiment, controller 160 increases or decreases a speed or intensity of pumping operations at pump 150 in order to maintain a constant volume flow of air, or in order to maintain a constant negative pressure. Controller 160 may be implemented, for example, as custom circuitry, as a hardware processor executing programmed instructions, or some combination thereof.

The amount of holding force (FH) applied by the scroll 130 to the object 140 is based upon the difference between a volume per unit time drawn by pump 150 (VP), a volume per unit time at which air leaks through end flaps 136 of the scroll 130 (VL), and a total area covered by the scroll 130. FH may also be modeled as a function of the pressure applied by pump 150. VL is overcome by VP. Hence, VP should be equal to or larger than VL. Scroll 130 is not affixed to the rigid tool 110 via sealant, glue, fasteners, magnetism, etc. However, vacuum under the scroll 130 is maintained by pump 150 while air is leaking into the system through the perimeter. Thus, minor air leaks may still exist in this configuration because negative pressure is the primary (e.g., sole) force that secures the scroll 130 to the rigid tool 110. The air leaks may be caused by wrinkles in the scroll 130 that provide passages for airflow. However, wrinkles are but one cause of air leaks, as air will leak out of the edge of the scroll 130 when the scroll 130 is not sealed to the rigid tool 110. Even so, VL remains small, and hence negative pressure is maintained by evacuating an equal or greater amount of air than is lost via leaks between end flaps 136 of impermeable membrane 132 and the rigid tool 110.

Permeable layer 134 comprises a material that is capable of deforming as the impermeable membrane 132 applies force, drawing snugly over the object 140 while still enabling air to be drawn freely across the object 140. That is, the permeable layer 134 enables the drawing of air across the object 140 without causing markoff at the object 140. For example, the permeable layer 134 may comprise a compliant biplanar mesh of material that facilitates airflow. Permeable layer 134 is a high-flow material, which is to say that permeable layer 134 does not substantially restrict the rate at which pump 150 draws air. The resistance of permeable layer 134 to airflow therefore has a negligible impact on the flow rate of pump 150. In some embodiments, the permeable layer 134 comprises an open celled foam material. However, in such embodiments, the open celled foam material chosen is sufficiently rigid that it does not collapse under impermeable membrane 132, and sufficiently open that airflow is not inhibited. Collapsing of impermeable membrane 132 would shut off or restrict air flow, which is undesirable as air flow would then be restricted from such areas under impermeable membrane 132.

Impermeable membrane 132 may comprise any suitable gas-impermeable material that is pliable. For example, impermeable membrane 132 may comprise a plastic sheet that prevents air from escaping directly through it. In further embodiments, impermeable membrane 132 and permeable layer 134 may be structurally united or bonded for convenience. In one embodiment, both permeable layer 134 and impermeable membrane 132 comprise contact approved materials that are acceptable for use with carbon fiber composites and do not chemically interact with resin.

Illustrative details of the operation of scroll deployment system 100 will be discussed with regard to an embodiment of a method, which is shown as method 200 in FIG. 2. Assume, for this embodiment, that rigid tool 110 awaits placement of a preform for compaction and hardening into a composite part.

FIG. 2 is a flowchart illustrating a method 200 for operating a scroll deployment system in an illustrative embodiment. The steps of method 200 are described with reference to scroll deployment system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, object 140 is placed onto the surface 112 of the rigid tool 110. In one embodiment, this comprises laying up a preform onto the surface 112 via an Automated Fiber Placement (AFP) machine or other tool. In further embodiments, this comprises picking up and placing a preform from another location and placing it onto the surface 112.

Step 204 comprises disposing an end effector 120 over the object 140. In one embodiment, this comprises moving the end effector 120 over a rail, gantry, or track (not shown) in order to align the end effector with the object 140.

Step 206 includes spreading linkages 122 of the end effector 120, causing a scroll 130 of material between the linkages 122 to be disposed atop the object 140 while also surrounding the object. In one embodiment, the linkages 122 are spread by gravity as the spindles 124 follow a contour of the rigid tool when the end effector 120 is lowered. While spreading, the linkages pivot relative to the end effector 120. This causes the linkages 122 to contact and deflect from the rigid tool 110 (and/or object 140), swinging outward. In further embodiments, the linkages are motorized, and are actively driven apart from each other. When the linkages 122 are spread, spindles 124 that are coupled with the linkages are rotated. Because the scroll 130 is wound about the spindles 124, rotation of the spindles causes the scroll 130 to be dispensed, or for the material at the scroll to be unscrolled/deposited in place. This means that as the linkages 122 are spread, the spindles 124 proceed to roll in opposite directions, which exposes the scroll 130 for deployment. That is, because a portion of the scroll 130 is kept at a spindle 124 for one of the linkages 122, and another portion of the scroll is kept at a spindle for another of the linkages, the act of spreading the linkages unrolls the scroll 130 from the spindles.

In step 208, the scroll 130, which comprises an impermeable membrane that overlays a permeable layer and extends beyond a boundary of the permeable layer, is unrolled over the object 140. In one embodiment, this occurs in response to the linkages spreading, while in further embodiments wherein linkages are not utilized, this comprises unrolling the scroll 130 via any other suitable means.

In step 210, the port 152 applies a negative pressure to the scroll 130 that offsets air leaks between the scroll 130 and the object 140, thereby forming a suction hold that compacts the object 140 onto the rigid tool 110. Applying the negative pressure draws end flaps 136 of the impermeable membrane 132 of the scroll 130 into contact with the rigid tool 110. Applying negative pressure may be performed by drawing a desired amount of volumetric flow through the pump 150 as mentioned above, or by applying a constant amount of pressure via the pump 150. Because air is drawn via the port 152, applying negative pressure evacuates air from under the scroll 130. The negative pressure applies a desired amount of force, for a desired amount of time, in order to fully compact the object 140.

After compaction is completed, the linkages 122 are retracted, causing the scroll 130 to be drawn up from the preform. In embodiments where the scroll 130 includes one or more layers of fiber reinforced material, the compaction process secures the fiber reinforced material to the object 140. Thus, when the scroll 130 is retracted, these layers of fiber reinforced material remain at the object 140, while the permeable layer 134 and the impermeable membrane 132 are retracted. After the scroll 130 is removed, the scroll 130 can be cleaned, re-loaded with additional layers of fiber reinforced material, and/or replaced with another spindle that is already clean and loaded with desired materials.

Method 200 provides a technical benefit over prior techniques, because it enables rapid deployment of a tapeless compaction system, via an end effector that occupies relatively little space. It also enables deployment of layers of fiber reinforced material as a part of the compaction process. This enhances production speed and reduces labor.

Figure 3:
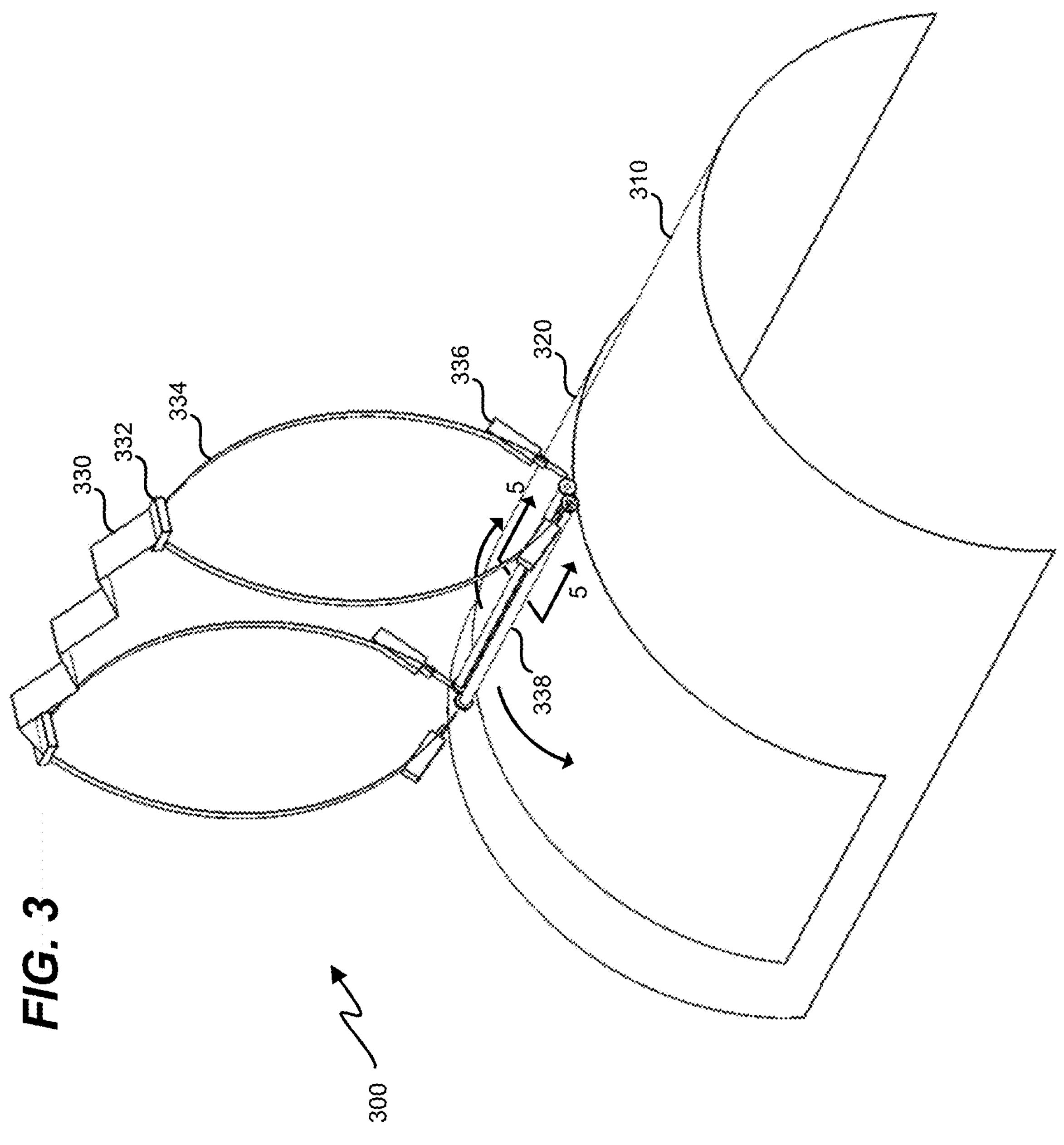
FIG. 3 depicts an end effector with an undeployed scroll in an illustrative embodiment.

FIG. 3 depicts an end effector 300 with an undeployed scroll in an illustrative embodiment. In this embodiment, the end effector 300 includes a frame 330, as well as bases 332, from which linkages 334 extend. Actuators 336 are disposed at the linkages 334, and facilitate retraction of the linkages 334 after compaction has been completed, by rolling the spindles 338 upward along a mandrel 310. In one embodiment, the actuators 336 comprise motors with slip clutches that walk spindles 338 back upwards after compaction has been completed. In this embodiment, the end effector 300 deploys a scroll of material from the spindles 338 onto a preform 320 that has been placed onto the mandrel 310.

Figure 4:
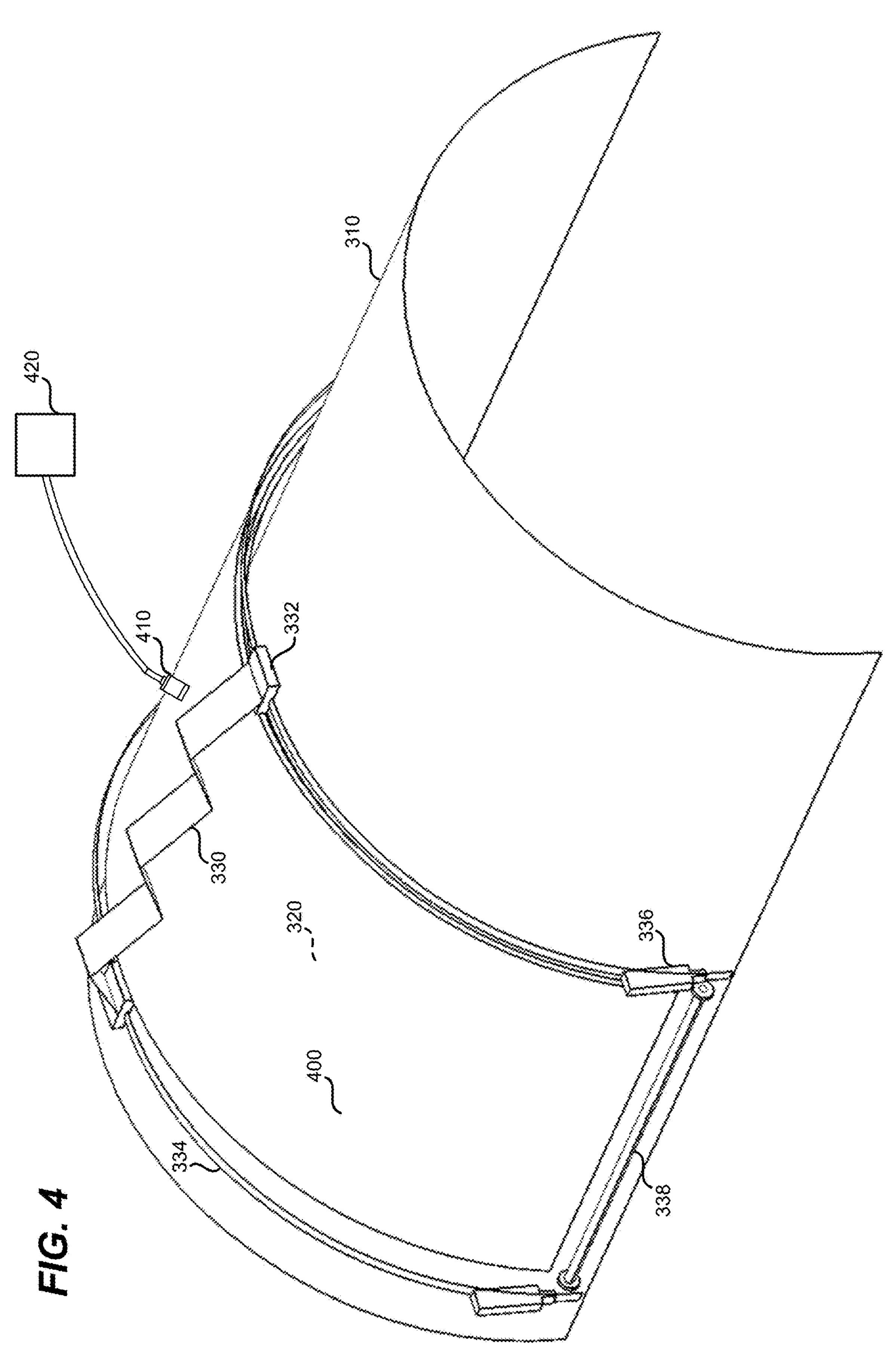
FIG. 4 depicts an end effector with a deployed scroll in an illustrative embodiment.

FIG. 4 depicts the end effector 300 of FIG. 3 with a deployed scroll 400 in an illustrative embodiment. As shown in FIG. 4, the spindles 338 have been moved to deploy the scroll 400 so that the scroll 400 covers the entirety of the preform 320. A vacuum port 410 is utilized by a pump 420 to apply negative pressure during the deployment of the scroll 400, and is also used after deployment to compact the preform 320 into place.

Figure 5:
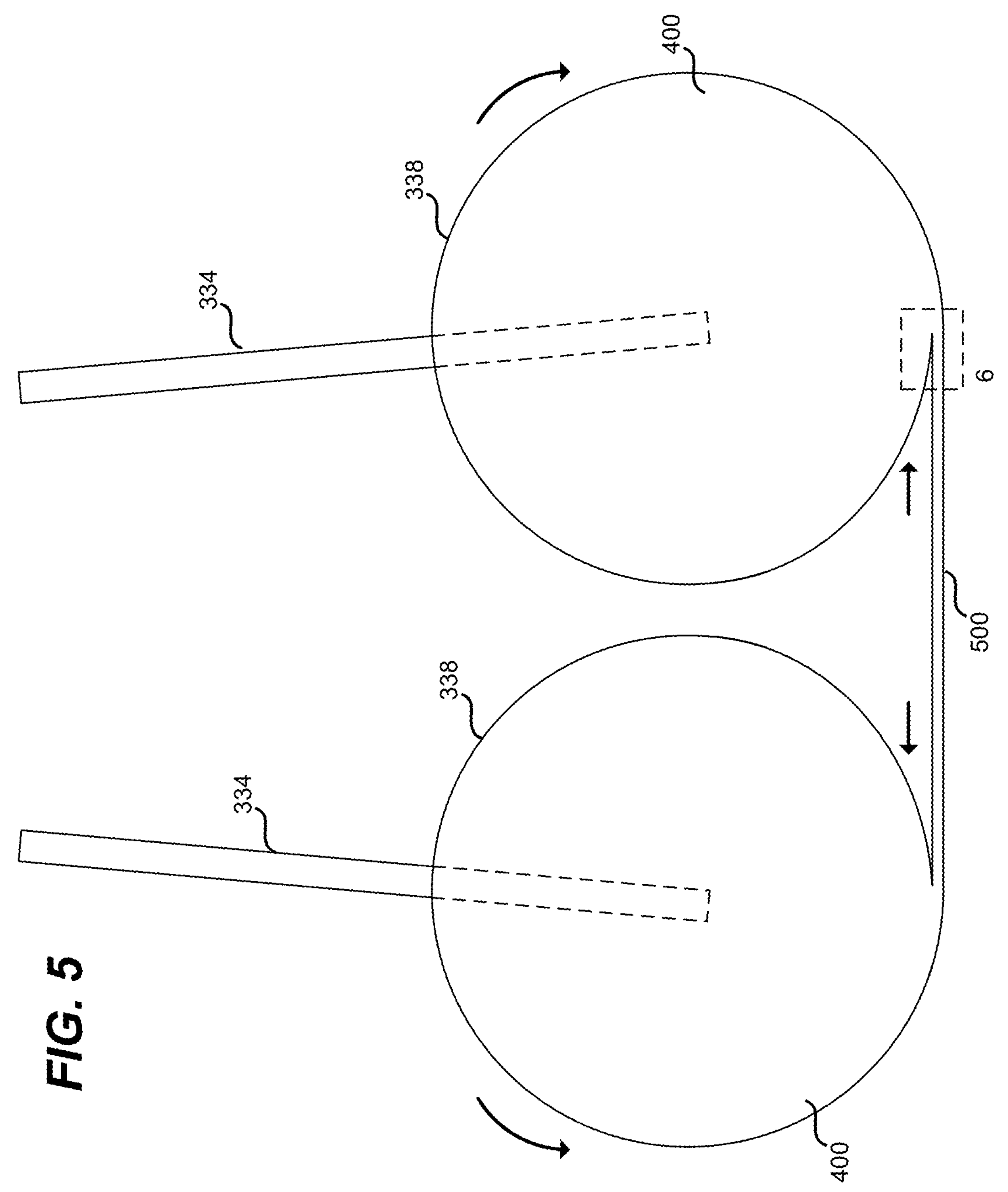
FIG. 5 is a section cut view of a scroll in an illustrative embodiment.

FIG. 5 is a section cut view of a scroll 400 in an illustrative embodiment, and corresponds with view arrows 5 of FIG. 3. The scroll 400 is wrapped around spindles 338, which roll apart from each other as linkages 334 spread outward. This causes a web 500 of the scroll 400 to be exposed for deployment.

Figure 6:
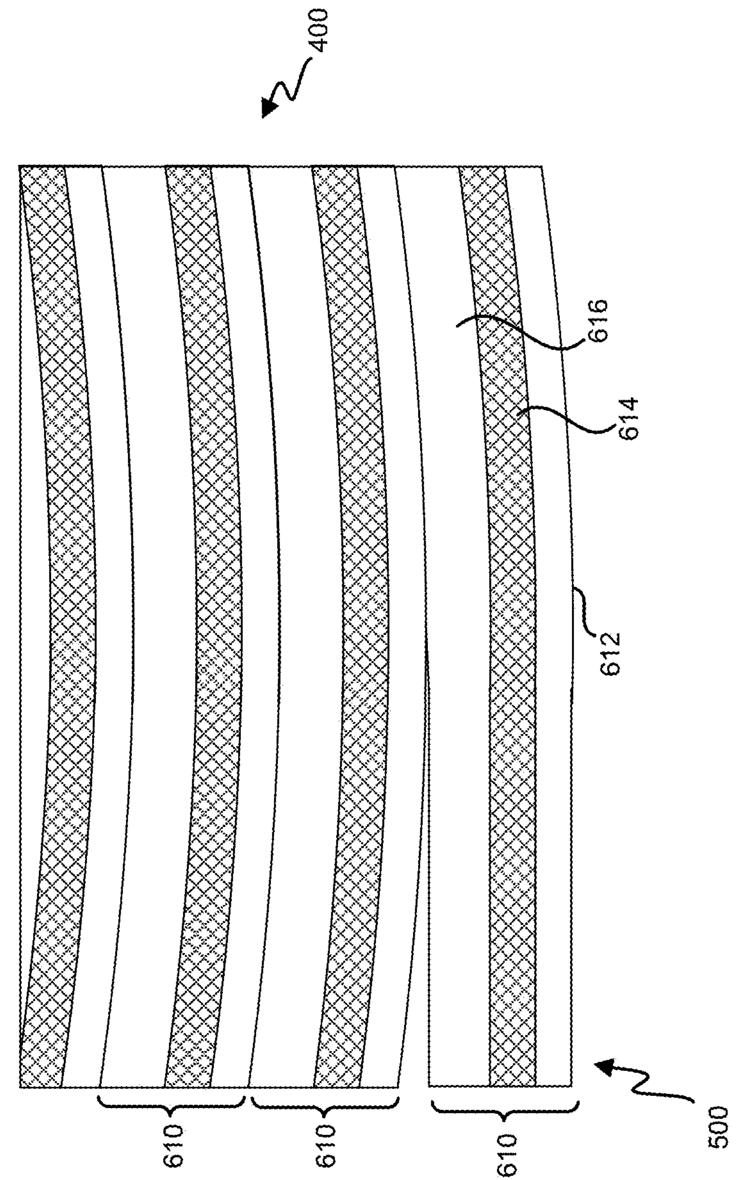
FIG. 6 is a zoomed in view of a portion of a scroll that includes layers of fiber reinforced material in an illustrative embodiment.

FIG. 6 is a zoomed in view of a portion of a scroll that includes layers of fiber reinforced material in an illustrative embodiment, and corresponds with region 6 of FIG. 5. FIG. 6 illustrates that the scroll 400 includes multiple layers. In this embodiment, the scroll 400 includes one or more layers 612 of fiber reinforced material. Layers 612 directly contact an underlying object when the scroll 400 is deployed, and may form Outer Mold Line (OML) or Inner Mold Line (IML) plies for a composite part. A permeable layer 614 follows the layers 612, and enables negative pressure to be uniformly distributed along the underside of the scroll 400 when deployed, as discussed above. In embodiments where the scroll 400 does not include layers of fiber reinforced material, the permeable layer 614 is placed into direct contact with the underlying object. The permeable layer 614 is followed by an impermeable layer 616, which prevents airflow from crossing it, when the scroll is deployed. When laid flat, the scroll 400 includes only one grouping 610 of layers 612, permeable layer 614, and impermeable layer 616. However, the scroll 400 is wound around a spindle such that the grouping 610 is visible multiple times along the diameter of the spindle.

Figure 7:
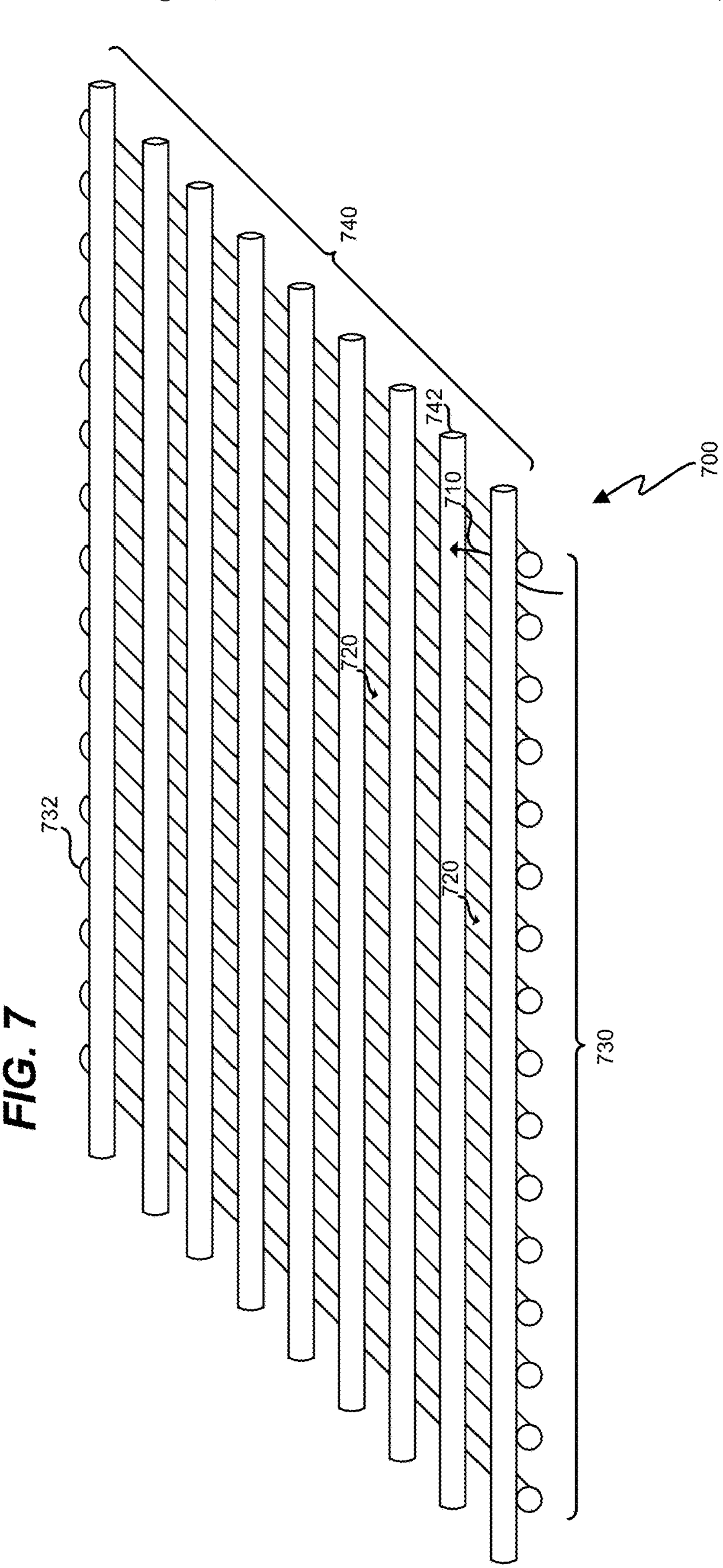
FIG. 7 depicts a permeable layer in an illustrative embodiment.

FIG. 7 depicts a permeable layer that is both vertically and laterally air-permeable in an illustrative embodiment. That is, air 710 may flow freely through gaps 720 in permeable layer 700, as well as across gaps 720 in permeable layer 700. This is possible because permeable layer 700 is a biplanar mesh. A first layer 730 of the biplanar mesh comprises structural elements 732 that are arranged parallel with each other, and a second layer 740 of the biplanar mesh comprises structural elements 742 that are arranged parallel with each other, but in a different direction than the first layer 730. First layer 730 enables air to flow horizontally in a first direction, and second layer 740 enables air to flow horizontally in a second direction. Meanwhile, both layers allow air to flow freely vertically. Thus, if a negative pressure is applied to one portion of permeable layer 700, the negative pressure may draw air evenly across the entirety of permeable layer 700. Permeable layer 700 enables free airflow, and does not interfere with the drawing of air by a pump. That is, permeable layer 700 does not limit the CFM rate of a pump. Permeable layer 700 may comprise polyethylene, polypropylene, nylon, etc. In one embodiment, permeable layer 700 is chosen as a "contact approved" material that will not chemically interfere with the adhesion of curable resin at the object being secured. For example, permeable layer 700 may be made from a silicone free material that does not mark an underlying object 140.

The above-described apparatus and method relate to the use of an opposed pair of two rollers, and a vacuum port configured to apply vacuum via an aperture of the material. However, further configurations are possible in other embodiments. By way of example, in further embodiments, the material is scrolled on a single roller rather than an opposed pair of rollers, and/or vacuum is applied via the end of the roller spindle, via a chamber in the spindle and perforations through the spindle. To illustrate these configurations, an embodiment of a vacuum system that includes both of these configurations, as well as methods for utilizing such a system, are shown in FIGS. 8-11, and described next.

Figure 8:
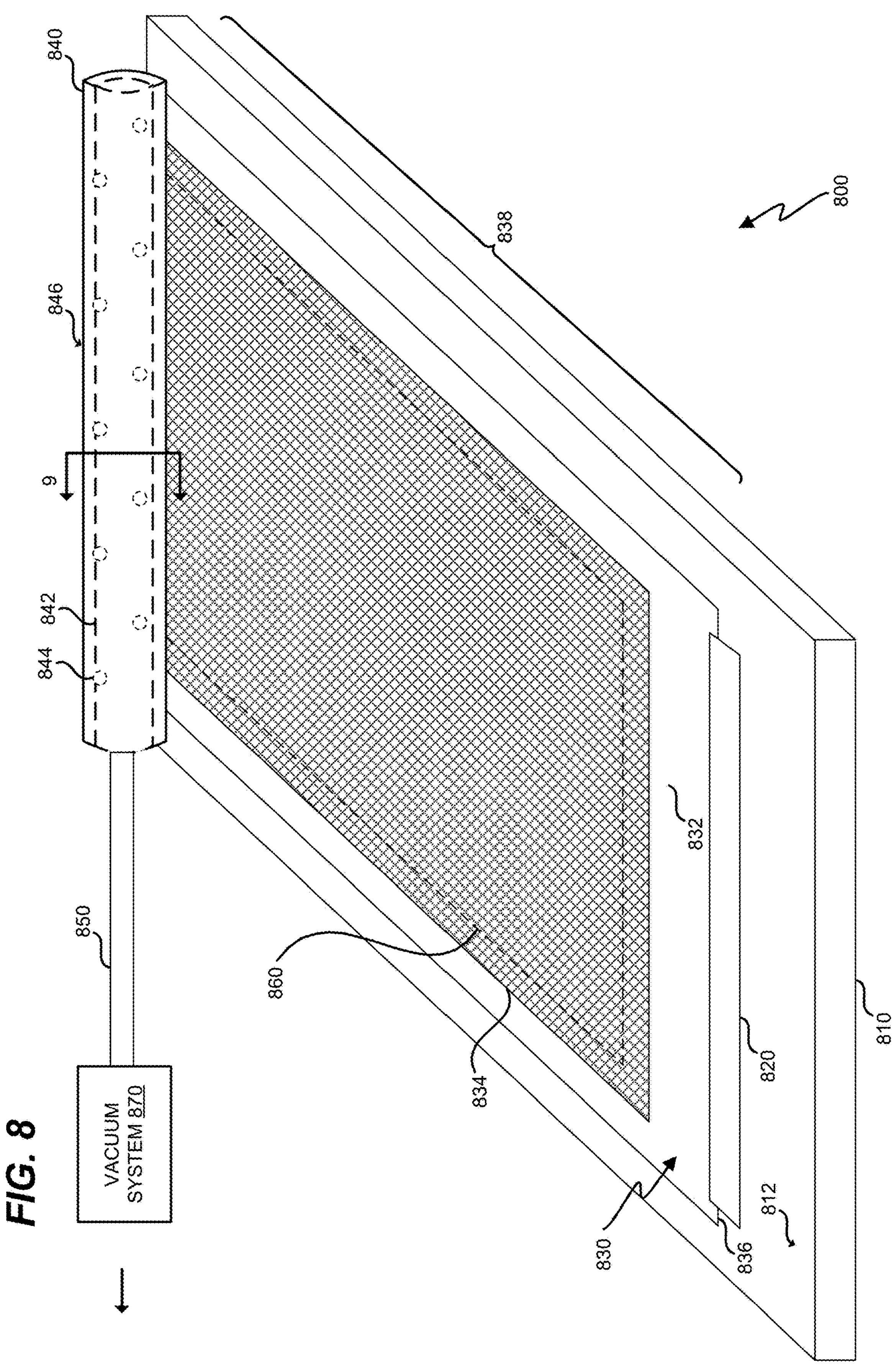
FIG. 8 is a diagram depicting a vacuum system coupled to a spindle in an illustrative embodiment.

FIG. 8 is a diagram 800 depicting a vacuum system 870 coupled to a spindle 840 in an illustrative embodiment. As shown in FIG. 8, the spindle 840 includes a chamber 842 having multiple perforations 844 that lead to an exterior 846. The chamber 842 communicates with vacuum port 850, which means that when vacuum system 870 evacuates air from the vacuum port 850, air inside of the chamber 842 is removed.

A scroll 838 of material 830 is wrapped around the spindle 840, and covers an underlying preform 860 for a composite part, or any other suitable object. An end of the scroll 838 is sealed to the spindle 840 around the perforations 844, such that suction applied via vacuum port 850 results in negative pressure being distributed through the scroll 838. Further details of this arrangement as provided in FIG. 9 below.

Another end 836 of the scroll 838 of material 830 is affixed via tape 820 to a surface 812 of the mandrel 810. In further embodiments, the end 836 is affixed to the mandrel 810 via the application of negative pressure to the scroll 838. The material 830 includes multiple layers, including at least one impermeable membrane 832, as well as a permeable layer 834 (e.g., a biplanar mesh) disposed beneath the impermeable membrane 832. The permeable layer 834 is in fluid communication with the chamber 842 inside of the spindle 840. Further details of an arrangement of layers for the material 830 are discussed below with regard to FIG. 9.

Implementing a spindle 840 that is hollow, and/or coupling a vacuum port 850 to the hollow portion of the spindle 840, results in numerous benefits by enabling a single component (i.e., the spindle) to perform multiple functions which facilitate not just unrolling of material, but also compaction of an underlying preform 860. In further embodiments, multiple spindles (such as the spindles depicted in FIGS. 3-4) are implemented as hollow spindles with chambers and vacuum ports in order to apply negative pressure. For such embodiments, vacuum ports for different spindles can be placed on the same side of each of the spindles, different sides of the spindles, or both sides of the spindles as desired.

Figure 9:
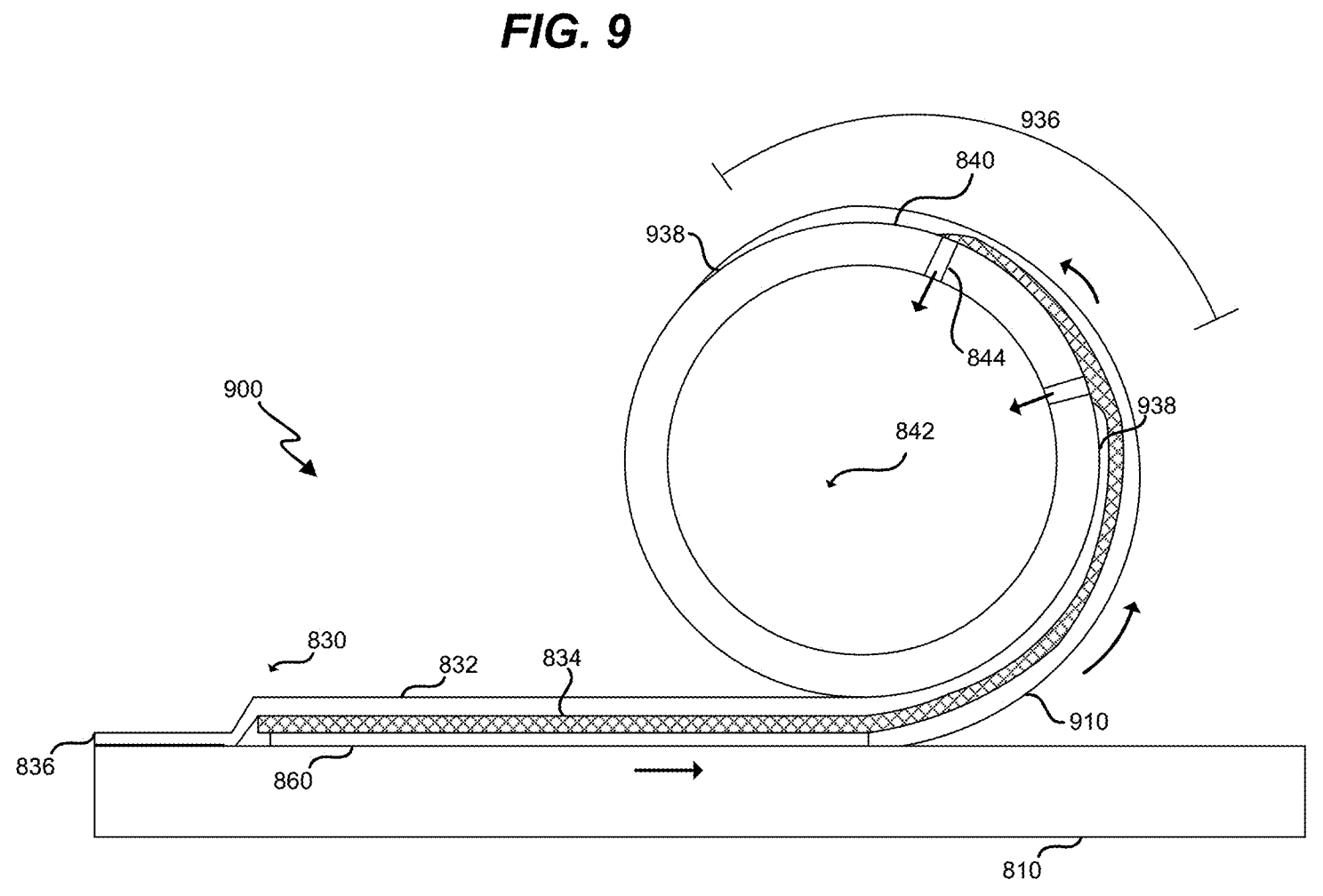

FIG. 9 is a cut-through view 900 of the spindle 840 of FIG. 8 in an illustrative embodiment. The dimensions of FIG. 9 have been adjusted to better illustrate the spindle 840 in relation to other components depicted in FIG. 8, and hence the dimensions of these FIGS. do not correspond. FIG. 9 illustrates how airflow travels from the material 830 to the spindle 840 when suction is applied, as indicated by arrows. As shown in FIG. 9, permeable layer 834 extends into contact with perforations 844, and thus is in fluid communication with the perforations 844. Furthermore, the perforations 844 are disposed between locations 938 where an end 936 of the scroll is sealed to the spindle 840. The permeable layer 834 is bounded by a first impermeable membrane 832 that forms an upper boundary atop the preform 860, and is further bounded by a second impermeable membrane 910 that forms a lower boundary. The impermeable membranes contact the permeable layer, and hence contain airflow to within the permeable layer 834.

The first impermeable membrane 832 terminates after the permeable layer 834, and the second impermeable membrane 910 terminates prior to reaching the preform 860. The second impermeable membrane 910 prevents pressure loss from the permeable layer 834 during and after the unrolling process, by providing a direct flow pathway to the chamber 842 of the spindle 840. In further embodiments such as those discussed above, the scroll 838 is wrapped around a second spindle, and end 836 of the scroll is sealed to the second spindle in a similar fashion to that described above for end 936.

FIG. 10 is a flowchart depicting a method 1000 of applying negative pressure via a spindle in an illustrative embodiment. Step 1002 includes disposing a spindle 840 atop an object, such as a preform for a composite part. This may comprise physically placing the spindle 840 onto the object, or onto a mandrel 810 that the object has been laid-up onto. Step 1004 includes unrolling a scroll 838 of material 830 from the spindle 840 over the object, thereby covering the object with the material. In some embodiments, the act of unrolling places the permeable layer directly into contact with the object.

Step 1006 includes applying negative pressure to a permeable layer 834 in the material 830 that is in fluid communication with a chamber 842 inside of the spindle 840. In one embodiment, applying the negative pressure is performed via a vacuum port 850 in fluid communication with the chamber 842, and via multiple perforations 844 at the spindle 840 that link the chamber 842 to the permeable layer 834. The negative pressure is distributed across the impermeable membrane via the permeable layer, which ensures that the impermeable membrane does not "pinch off" or self-seal in response to negative pressure at an undesired location. Step 1008 includes forming a suction hold that draws an impermeable membrane of the material into contact with the object, in response to the negative pressure. The suction hold is formed naturally as negative pressure is distributed across the impermeable membrane. At locations where the permeable layer 834 terminates and the impermeable membrane 832 continues, the negative pressure causes the impermeable membrane to seal itself to the underlying mandrel 810.

Figure 11:
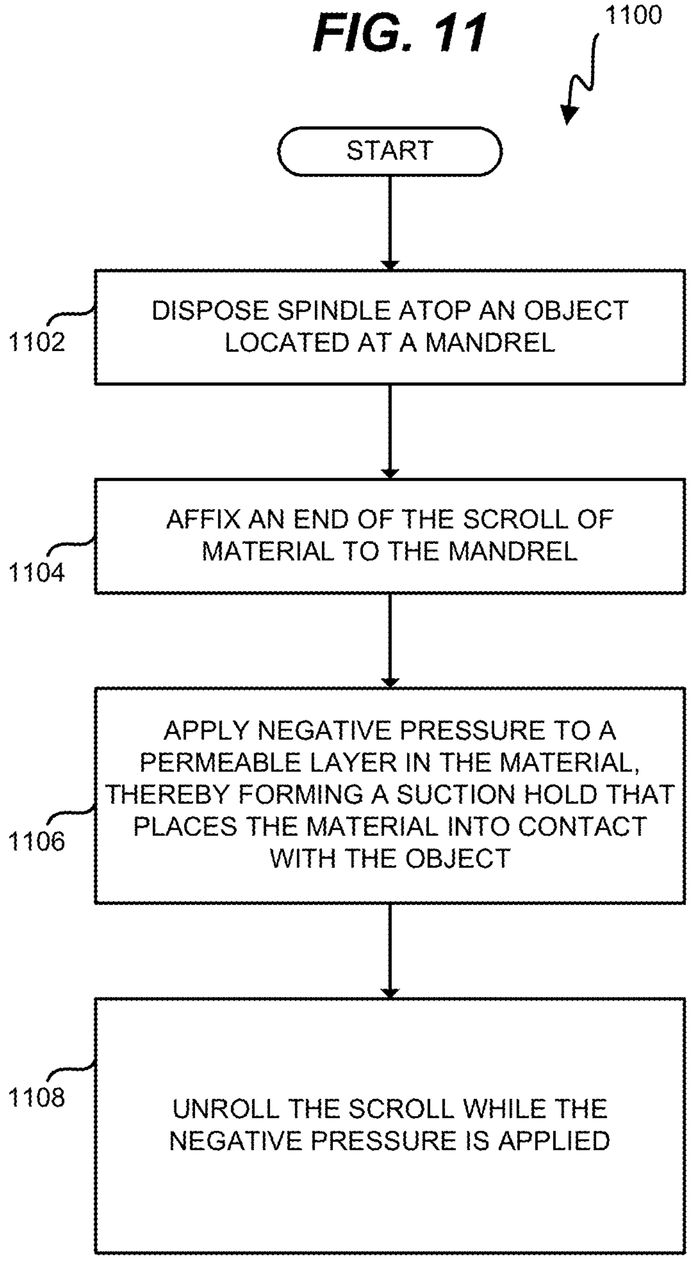
FIG. 11 is a flowchart depicting a method of unrolling a scroll from a single spindle in an illustrative embodiment.

FIG. 11 is a flowchart depicting a method 1100 of unrolling a scroll from a single spindle in an illustrative embodiment. Method 1100 includes disposing a spindle 840 atop an object located at a mandrel 810 in step 1102. Step 1104 includes affixing an end 836 of a scroll 838 of material at the spindle 840 to the mandrel 810. In one embodiment, affixing the end 836 of the scroll comprises taping the end 836 of the scroll 838 to the mandrel 810. In a further embodiment, affixing the end of the scroll comprises forming a suction hold between an impermeable membrane of the material and the mandrel, as discussed above for method 1000. Thus, activating a vacuum system 870 can serve to affix the end 836, as long as no substantial air leaks exist.

Step 1106 includes applying negative pressure to a permeable layer in the material, thereby forming a suction hold that places the material into contact with the object. This can be performed in a similar manner to step 1008 of method 1000 discussed above. In one embodiment, applying the negative pressure is performed via multiple perforations 844 at the spindle that link a chamber of the spindle to the permeable layer. The permeable layer 834 distributes the negative pressure across the impermeable membranes of the material.

Step 1108 includes unrolling the scroll while the negative pressure is applied. In one embodiment, unrolling the scroll comprises covering a preform for a composite part. Unrolling the scroll places the permeable layer directly into contact with the object. Furthermore, because the end 836 of the scroll 838 is affixed in place, the scroll does not wander or change position as the unrolling process continues. This enables the entire scroll to be unwound (or the entire object to be covered) as desired. In further embodiments, the method further comprises compacting the object via the suction hold. This can comprise increasing negative pressure until the object is pressed firmly into the mandrel at a desired level of pressure.

While FIGS. 8-11 depict a single roller, tube-applied vacuum apparatus and related methods, in further embodiments various aspects and features mentioned herein are applied to a variety of systems. For example, the arrangement of chambers and vacuum systems depicted in these FIGS. 8-11 may be applied to a two-roller embodiment as depicted in in FIGS. 1 and 3-5 except with the vacuum applied via one or more ends of one or both spindles. In a further embodiment, a one-roller embodiment as depicted in these FIGS. 8-11 may apply vacuum via an aperture in the material as discussed with regard to FIGS. 1 and 3-5.

Examples

In the following examples, additional processes, systems, and methods are described in the context of a scroll deployment system for compacting preforms onto rigid tooling (e.g., a mandrel).

Figure 12:
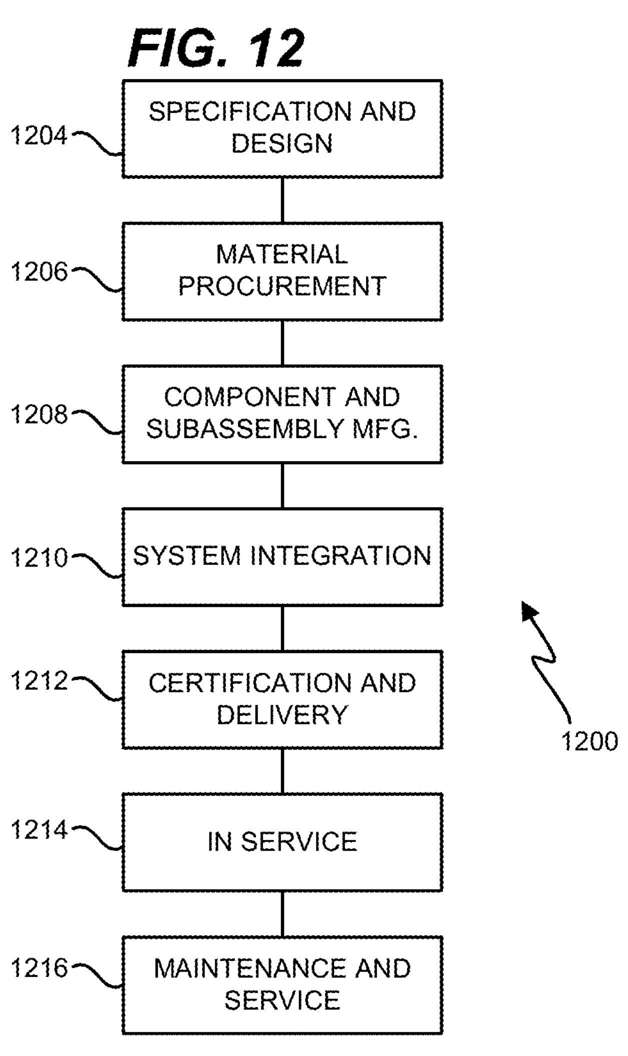
FIG. 12 is a flow diagram of aircraft production and service methodology in an illustrative embodiment.

Referring more particularly to the drawings, embodiments of the disclosure may be described in the context of aircraft manufacturing and service in method 1200 as shown in FIG. 12 and an aircraft 1202 as shown in FIG. 9. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

Figure 13:
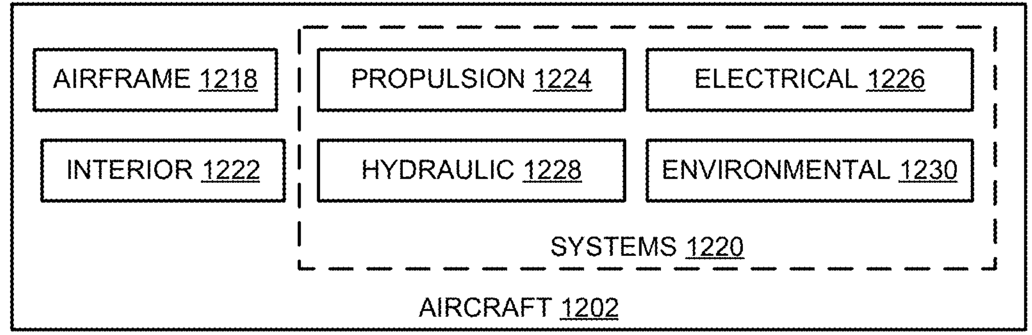
FIG. 13 is a block diagram of an aircraft in an illustrative embodiment.

As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. Thus, the invention may be used in any stages discussed herein, or any combination thereof, such as specification and design 1204, material procurement 1206, component and subassembly manufacturing 1208, system integration 1210, certification and delivery 1212, service 1214, maintenance and service 1216 and/or any suitable component of aircraft 1202 (e.g., airframe 1218, systems 1220, interior 1222, propulsion system 1224, electrical system 1226, hydraulic system 1228, and/or environmental 1230).

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as “processors,” “controllers,” or some similar terminology. When provided by a processor, the functions may be provided by a single dedicated processor, by a single shared processor, or by a plurality of individual processors, some of which may be shared. Moreover, explicit use of the term “processor” or “controller” should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus for compacting an object onto a rigid tool, the apparatus comprising:
multiple spindles; and
a scroll of material, wherein a respective portion of the scroll of material is stored on each respective spindle of the multiple spindles, wherein each respective portion of the scroll of material is deployed from each respective spindle for placement onto the object on the rigid tool as each of the spindles moves apart from one other, wherein the scroll of material comprises a permeable layer and an impermeable membrane, wherein the impermeable membrane overlays the permeable layer when the scroll of material is stored on each respective spindle of the multiple spindles, and wherein the impermeable membrane extends beyond a perimeter of the permeable layer.

2. The apparatus of claim 1 further comprising:
an end effector that is configured to move towards the rigid tool; and
at least one pair of linkages that are coupled to the end effector and are configured to pivot relative to the end effector as the end effector is moved towards the rigid tool, thereby causing respective distal ends of each linkage of the at least one pair of linkages to move apart from one another,
wherein each of the spindles is coupled to a respective distal end of a respective linkage of the at least one pair of linkages and rotatably mounted to the respective linkage, such that the spindles are configured to rotate relative to the at least one pair of linkages to deploy the scroll of material onto the object as the end effector moves towards the rigid tool and the at least one pair of linkages are pivoted.

3. The apparatus of claim 1 wherein:
the rigid tool comprises a mandrel for a section of fuselage for an aircraft.

4. The apparatus of claim 1 further comprising:
a port that penetrates into the scroll of material in fluid communication with the permeable layer.

5. The apparatus of claim 1 wherein:
the scroll of material extends beyond the object.

6. The apparatus of claim 1 wherein:
the scroll of material comprises at least one layer of fiber reinforced material positioned beneath the permeable layer such that, after compaction, retraction of the multiple spindles removes the impermeable membrane and permeable layer from the object, while the at least one layer of fiber-reinforced material remains on the object at the rigid tool.

7. The apparatus of claim 4 further comprising:
a pump that applies negative pressure via the port.

8. The apparatus of claim 1 wherein:
the permeable layer comprises a biplanar mesh.

9. An apparatus comprising:
at least one spindle, comprising:
an exterior;
a chamber; and
perforations that couple the chamber to the exterior; and
a scroll of material that is wrapped around the exterior of the spindle, wherein one end of the scroll of material is sealed to the spindle, and the scroll of material comprises:
a permeable layer in fluid communication with the chamber through the perforations; and
an impermeable membrane that contacts the permeable layer.

10. The apparatus of claim 9 further comprising:
a vacuum system coupled with the chamber.

11. The apparatus of claim 10 further comprising:
a vacuum port in fluid communication with the chamber at the spindle that couples the spindle with the vacuum system.

12. The apparatus of claim 9 wherein:
the permeable layer comprises a biplanar mesh.

13. The apparatus of claim 9 wherein:
the scroll of material further comprises a second impermeable membrane that contacts the permeable layer.

14. The apparatus of claim 9 wherein:
the at least one spindle comprises two spindles, wherein the scroll of material is wrapped around each of the two spindles, and ends of the scroll of material are sealed to the two spindles.

15. The apparatus of claim 9 wherein:
perforations are disposed between locations where the end of the scroll of material is sealed to the spindle.

* * * * *